United States Patent

Plumley

[15] 3,707,714

[45] Dec. 26, 1972

[54] MULTIPLE ERROR DETECTOR

[72] Inventor: Christopher Plumley, Middlesex, Mass.

[73] Assignee: Honeywell Inc., Minneapolis, Mich.

[22] Filed: Jan. 8, 1971

[21] Appl. No.: 105,127

Related U.S. Application Data

[63] Continuation of Ser. No. 771,186, Oct. 28, 1969, abandoned.

[52] U.S. Cl...........340/347 DD, 340/146.1, 235/155

[51] Int. Cl...............................................H04l 3/00

[58] Field of Search............340/347 DD, 345, 146.1

[56] References Cited

UNITED STATES PATENTS 2,737,647 3/1956 Oliwa ..................................340/345

*Primary Examiner*—Maynard R. Wilbur
*Assistant Examiner*—Jeremiah Glassman
*Attorney*—Fred Jacob and Ronald T. Reiling

[57] ABSTRACT

Apparatus for producing a coded indication of which single incoming line carries an error signal responds to the receipt of plural error signals concurrently on different lines by producing an unambiguous multiple error signal.

8 Claims, 4 Drawing Figures

INVENTOR.
CHRISTOPHER PLUMLEY
BY W. Hugo Liepmann
ATTORNEY

INVENTOR.
CHRISTOPHER PLUMLEY
BY
W. Hugo Liepmann
ATTORNEY

MULTIPLE ERROR DETECTOR

This is a continuation of the copending application Ser. No. 771,186, filed Oct. 28, 1968 and now abandoned.

BACKGROUND OF THE INVENTION

This invention provides apparatus for reporting plural errors detected with electrical equipment. More particularly, it provides error-signal reporting apparatus that both reports individual error signals and reports multiple-error conditions without ambiguity. The apparatus is efficient in that it employs essentially minimal hardware to provide this operation.

The invention also provides an improvement for an electrical code converter, such as a decimal to binary converter, for reporting when the converter receives plural input signals in the same brief time interval. The converter having this capability is particularly useful for reporting error signals.

An elementary technique for reporting error signals is to apply each such signal to an indicator or other output device. However, this approach is often undesirable because it requires a large plurality of indicators. The resultant number of indicators often requires an undue amount of control panel space, requires excessive operator surveillance and, further, is costly. Similarly, the many signal conductors and other electrical devices needed to drive the individual indicators involve further cost and add unnecessarily to the equipment bulk.

Accordingly, it is an object of this invention to provide logically simple apparatus for reporting error signals from a plurality of sources with a number of indicators materially less than the number of possible error signals to be reported.

Another object of the invention is to provide apparatus of the above character which reports the receipt of plural error signals in a single brief time interval without ambiguity.

Another object of the invention is to provide apparatus for indicating the coincident receipt of plural input signals at an electrical signal converter between input signals numerically coded with a radix ($m$) and output signals coded with a radix ($n$), where ($m$) and ($n$) are integers and ($m$) is larger than ($n$). A more particular object is to provide a decimal to binary converter of this character.

It is also an object of the invention to provide apparatus for reporting the coincident receipt of plural error-responsive signals at an error detector producing a binary-coded error-reporting output signal.

Another object is to provide apparatus of the above character which is compact and which is relatively simple and inexpensive to construct.

Other objects of the invention will in part be obvious and will in part appear hereinafter.

The invention accordingly comprises the features of construction, combinations of elements, and arrangement of parts exemplified in the constructions hereinafter set forth, and the scope of the invention is indicated in the claims.

GENERAL DESCRIPTION

Error-reporting apparatus embodying the invention has a code converter receiving the error signals to be reported and producing a coded identification of whichever single error signal is present. The converter output signal is coded in a number of digits considerably smaller than the number of error-signal lines input to the converter. Hence only relatively few connections are needed between the converter and the error indicators, typically lamps, and an equally small number of indicator lamps suffices.

However, in the prior art, a converter producing an output code having relatively few digits and hence efficient for the foregoing purposes of reducing the number of output indicators, nevertheless often produces an ambiguous output signal when it receives two or more error signals coincidentally or otherwise within a given short time interval.

The invention overcomes this problem by providing logic circuits that produce a "multiple error" signal when the converter receives plural error signals coincidentally. For example, in the embodiment illustrated hereinbelow, this multiple error signal can be such as to operate all output indicators, thereby making certain that the operator realizes a multiple-error condition is present. Where desired, the operator can use further equipment, not part of this invention, to analyze the multiple-error condition. However, with many kinds of equipment, multiple errors are seldom due to plural faults occurring simultaneously. Rather, they result from a single fault that causes the equipment being monitored to generate several error signals. In the latter instance, upon observing the multiple error signal, the operator does not identify the several error signals individually but rather directly checks for a single fault likely to have caused the multiple-error condition. Thus, in short, the checking of many kinds of equipment requires that only single errors be identified, and that the occurrence of multiple errors simultaneously or coincidentally be reported without ambiguity. The apparatus provided with the present invention is particularly suited for checking such equipment.

BRIEF DESCRIPTION OF FIGURES

For a fuller understanding of the nature and objects of the invention, reference should be had to the following detailed description taken in connection with the accompanying drawings, in which.

DESCRIPTION OF ILLUSTRATED EMBODIMENT

Figure 1:
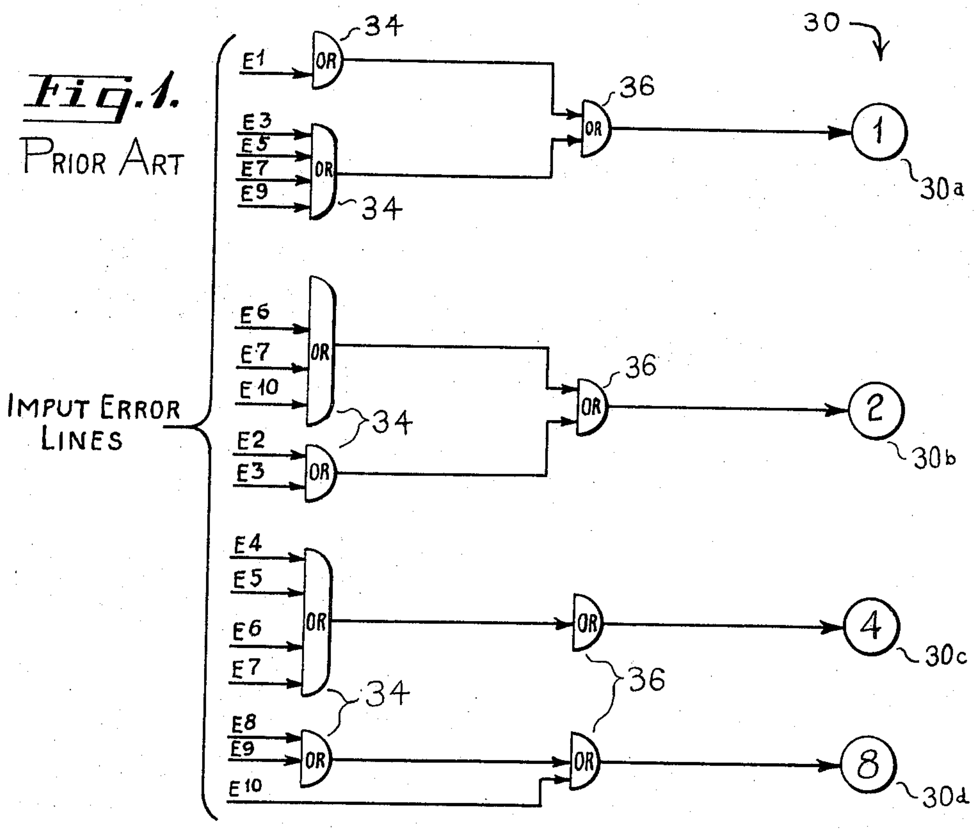
FIG. 1. PRIOR ART
FIG. 1 is a block schematic representation of a conventional, prior art, decimal to binary type of converter.
Figure 4:
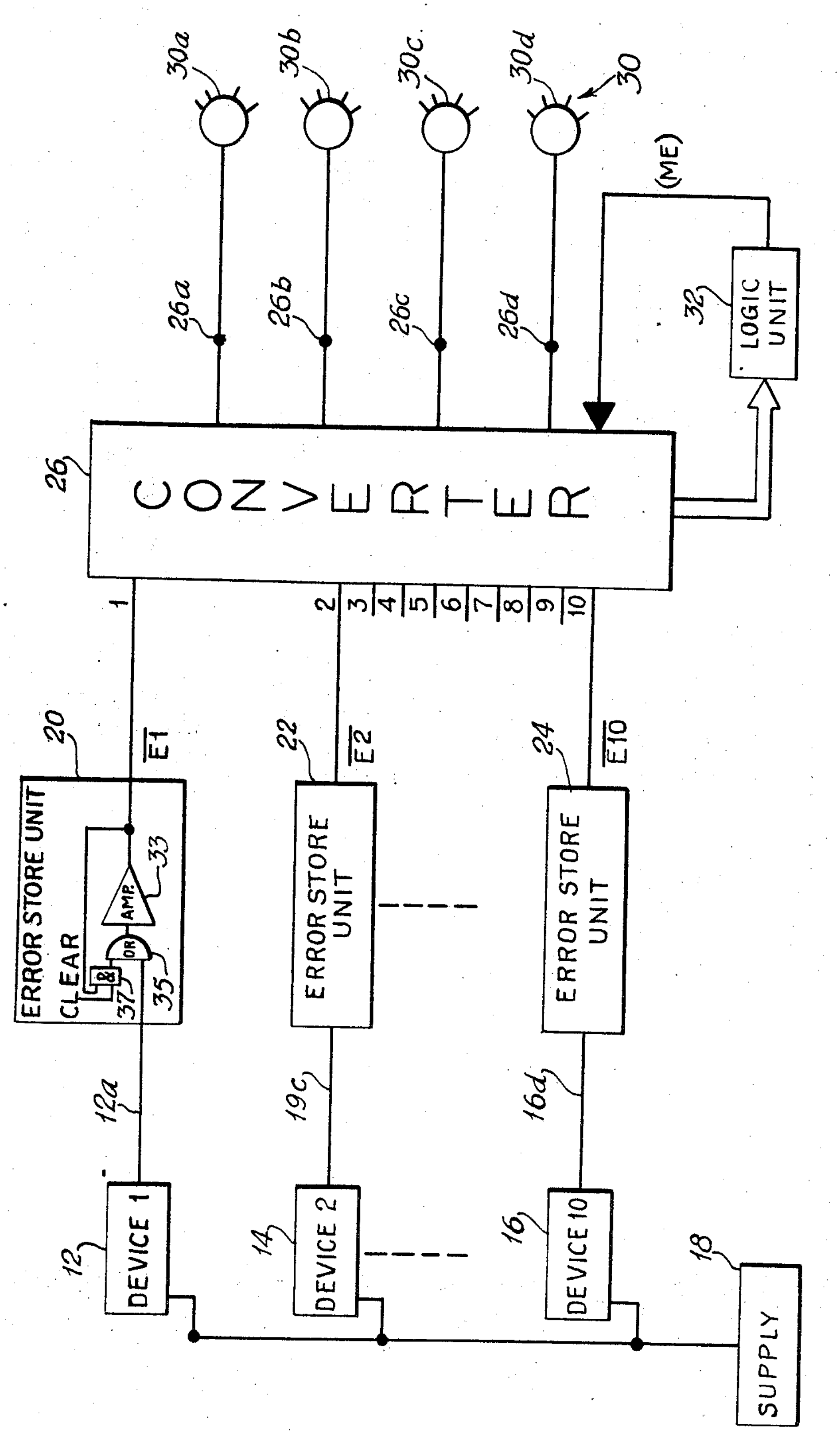
FIG. 4 is a block schematic representation of an electrical system in which a converter as shown in FIG. 2 and a logic unit as shown in FIG. 3 monitor plural error signals in accordance with the invention.

FIG. 4 shows a system of electrical devices 12, 14 and 16, operated from a common supply 18, each of which produces at least one error-reporting signal on a line **12*a*, 14*a*, 16*a* therefrom when a selected malfunction occurs in that device. An error store unit 20, 22, 24 is associated with each device 12, 14, 16** respectively, and receives the error-reporting line therefrom. FIG. 1 shows that the illustrated system has 10 devices and hence 10 error store units; for simplicity, only three devices and three associated units are shown.

Each store unit develops an output signal having a no-error value $\bar{E}$ when it has not received an error-reporting signal from the associated device. On the other hand, upon receipt of an error-reporting signal, the store unit output signal changes to an error value E; each illustrated store unit 20, 22, 24 maintains this error signal until cleared to the no-error condition, at which time it again develops the $\bar{E}$ signal.

As also shown in FIG. 4, a code converter 26 receives the output signal from each error store unit. The converter develops a four digit output signal coded according to conventional binary notation to identify which of its 10 input terminals receives an error signal, i.e. a signal of value E. The converter applies these coded signals to output indicators illustrated as lamps 30.

Thus, when the second device 14, for example, develops an error-reporting signal on line 14*a*, converter 26 receives no-error, $\bar{E}$, signals at all inputs except the second one, which receives an error, E, signal from the store unit 22. In response to this set of input signals, the converter develops a binary ZERO signal at its terminals 26*a*, 26*c* and 26*d* so that the lamps 30*a*, 30*c* and 30*d* connected therewith remain "off". However, the converter develops a binary ONE at its output terminal 26*b* which, in turn, illuminates the lamp 30*b* connected therewith. The lamps 30 thus indicate the binary number 0010 to report that the number two device 14 is outputting an error-reporting signal.

With further reference to FIG. 4, when the converter 26 receives two or more error signals concurrently, it develops further signals that cause a logic unit 32 to produce a "multiple error" signal. The logic unit applies the multiple error (ME) signal back to the converter to illuminate all four lamps 30. In this manner, the invention provides equipment for reporting multiple concurrent error signals in an unambiguous manner.

The foregoing multiple-error operation of the FIG. 4 system should be contrasted with the operation a conventional code converter provides when it receives multiple input signals. For example, in the event that both devices 12 and 14 operate the associated store units 20 and 22 to apply error signals to a conventional decimal-to-binary type converter connected in place of the present converter 26, the conventional converter would produce a 0010 output signal. This binary indication is the same one the conventional converter produces when it receives a single error signal on its third input terminal.

Thus, a conventional converter would report this illustrative multiple-error condition by indicating that the number 3 device (not shown) was outputting an error-reporting signal to its associated error store unit. This, of course, would be a false indication and is the specific problem which the present invention resolves.

FIG. 1 shows a typical prior art decimal-to-binary conversion network which, when used in FIG. 4 in place of the present converter 26, would produce an ambiguous output indication as just discussed. This prior art network is shown in FIG. 1 as if it were connected in the FIG. 4 system in place of the converter 26 and, hence, it is shown receiving the error signals E1 through E10 output from the FIG. 4 error store units.

Specifically, the prior conversion network of FIG. 1 has a first stage of OR circuits 34 receiving the store unit output signals in selected combinations as illustrated. A second stage of OR circuits 36 receives the output signals from the OR circuits 34 and receives the incoming E10 error signal. Lamps 30*a*, 30*b*, 30*c* and 30*d* receive the output signals from the OR circuits 34, as is also shown in FIG. 4.

The particular scheme chosen for mapping between the decimally-numbered input lines to the conversion network 26 and the binary-coded output lines connected to the lamps 30 is not critical to the invention. Table I shows the particular coding arrangement which the FIG. 1 converter 26 employs. A "0" in the Table represents a binary ZERO and a "1" represents a binary ONE. Only the latter digits turn on the lamps 30. Also in Table I, digit 1 of the output signal is applied to FIG. 1 lamp 30*a* and causes the lamp to light only when the digit is a ONE. Similarly, the output signal digit 2 is applied to lamp 30*b*, and digits 3 and 4 are applied respectively to lamps 30*c* and 30*d*. The output signal digits 1, 2, 3, and 4; and hence the lamps 30*a*, 30*b*, 30*c*, and 30*d*; have the binary weights $2^0$, $2^1$, $2^2$ and $2^3$ respectively.

TABLE I

| Decimally Ordered Input Error Signals | Binary Coded Output Signals | | | |
|---|---|---|---|---|
| | Digit 4 | Digit 3 | Digit 2 | Digit 1 |
| None | 0 | 0 | 0 | 0 |
| E1 | 0 | 0 | 0 | 1 |
| E2 | 0 | 0 | 1 | 0 |
| E3 | 0 | 0 | 1 | 1 |
| E4 | 0 | 1 | 0 | 0 |
| E5 | 0 | 1 | 0 | 1 |
| E6 | 0 | 1 | 1 | 0 |
| E7 | 0 | 1 | 1 | 1 |
| E8 | 1 | 0 | 0 | 0 |
| E9 | 1 | 0 | 0 | 1 |
| E10 | 1 | 0 | 1 | 0 |

With further reference to FIG. 4, the illustrated error storage unit 20, preferably typical of the other storage units, employs an amplifier 33 receiving the signal on line 12*a* through an OR circuit 35. The amplifier output signal, in addition to being applied to the converter 26, is applied to a two-input AND circuit 37, and a clear signal is applied to the other AND circuit input. With this arrangement, the clear signal places the amplifier in the no-error condition and it applies the no-error signal E to the converter. However, the momentory appearance of an error-reporting signal on line 12*a* switches the amplifier to the error-indicating state where it produces the error signal E. In the absence of the clear signal, AND circuit 37 and OR circuit 35 recirculate the amplifier output signal back to the amplifier input to maintain the amplifier in the error-indicating state. The amplifier remains in the error-indicating state even after the error-reporting signal terminates and until the next clear signal again switches it to the no-error state.

Figure 2:
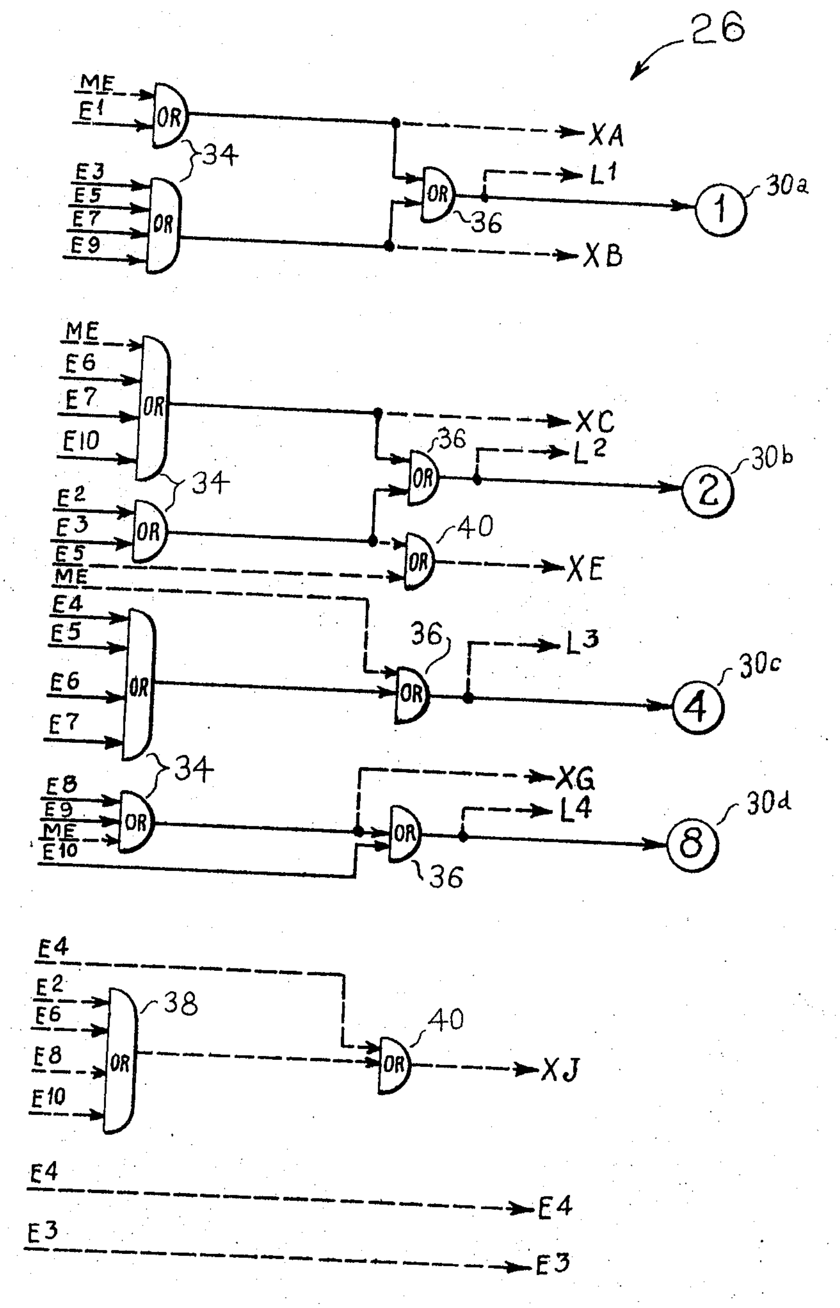
FIG. 2 is a schematic block representation of a decimal to binary converter of the type shown in FIG. 1 and embodying the present invention.

FIG. 2 shows the converter 26 of FIG. 4 as including the conversion network of FIG. 1 with an additional first stage OR circuit 38 and with two additional second stage OR circuits 40. Further, intermediate lines XA, L1, XB, L2, L3, XG and L4 are tapped off the FIG. 1 circuit. Two additional intermediate lines obtained without gating are labeled E4 and E3 inasmuch as these are the lines on which the converter receives the error signals E4 and E3, respectively. Also, the additional OR circuit 38 and one additional OR circuit 40 develop the intermediate line XJ, and the other additional OR circuit 40 provides the intermediate line XE.

Examination of FIG. 2 shows that only the E1 signal produces the Xa intermediate signal, and that any other odd numbered error signal produces the XB intermediate signal. Further, the L1 intermediate signal results when *any* odd numbered error signal is present. Further examination of FIG. 2 reveals that the remaining intermediate signals appear when any one signal, in each of the other groups of one or more error signals, is present.

The output signals from the FIG. 2 second stage OR circuits 36 are connected to the lamps 30 in the same manner as described with reference to FIGS. 1 and 4. Hence, upon receipt of any single error signal E1, E2, E3, ... E10, the FIG. 2 converter develops binary-coded output signals in accordance with Table I in the same manner as the FIG. 1 conversion network.

As will be described, the FIG. 4 logic unit 32 combines the intermediate signals developed on the FIG. 2 intermediate lines to produce a multiple error (ME) signal when the FIG. 2 converter receives two or more error signals at the same time.

Figure 3:
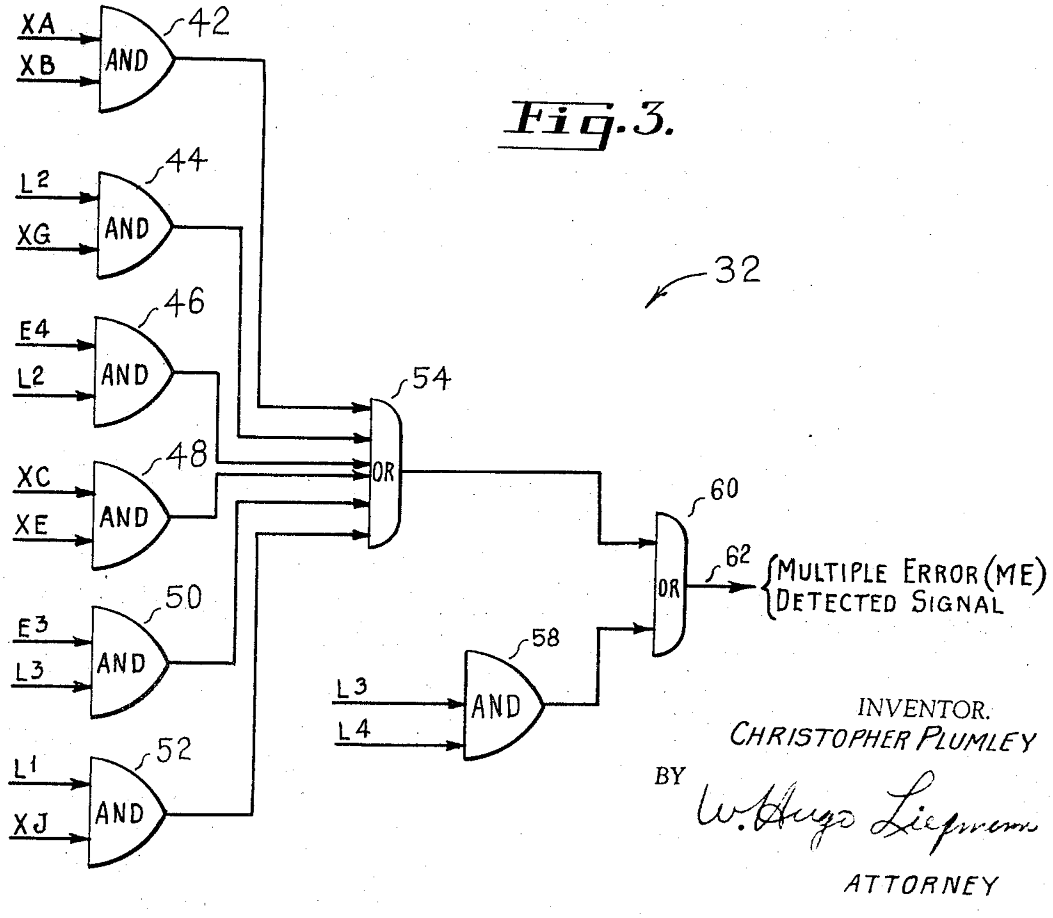
FIG. 3 is a block schematic representation of a logic unit for use with the inventive converter in FIG. 2 for producing a single digit multiple error signal.

The logic unit 32, shown in detail in FIG. 3, has AND circuits 42, 44, 46, 48, 50, 52 and 58 that receive the signals on pairs of intermediate lines as shown. An OR circuit 54 applies the output signals from AND circuits 42 – 50 to a further OR circuit 60. The OR circuit 60 develops the multiple error signal on line 62 when it receives a signal from either the OR circuit 54 or the AND circuit 58.

In this manner, the FIG. 2 converter develops intermediate signals which, when combined by the means of the logic unit 32 of FIG. 3, represent all possible combinations of two concurrent input signals to the converter 26 of FIG. 1. As a result, a multiple error signal appears whenever any two input terminals of the converter 26 receive error signals at the concurrent times.

The resultant multiple error signal is applied, as shown in FIG. 2, to each of four stage OR circuits 34 that are connected with different indicator lamps 30. With this arrangement, the multiple error signal causes the converter 26 to illuminate all four lamps 30, which is the multiple error output mentioned above.

The manner in which the FIG. 2 circuit for the converter 26 and the FIG. 3 circuit for the logic unit 32 are arranged to provide this operation is now described with reference to Table II.

This Table is prepared by first listing, in the "Error Line Pairs" column, all possible combinations of the error signals E1, E2, E3, ... E10 input to the converter 26. This column hence sets forth all the converter input signal conditions that are to be sensed as the multiple error condition.

The seven other columns in Table II, collectively labled "Intermediate Line Pairs", show that ANDing

TABLE II

| Error line pairs | Intermediate line pairs | | | | | | |
|---|---|---|---|---|---|---|---|
| | XA & XB | L2 & XG | E4 & L2 | XC & XE | E3 & L3 | L1 & XJ | L4 & L3 |
| E1 & E2 | | | | | | X | |
| E1 & E3 | X | | | | | | |
| E1 & E4 | | | | | | X | |
| E1 & E5 | X | | | | | | |
| E1 & E6 | | | | | | X | |
| E1 & E7 | X | | | | | | |
| E1 & E8 | | | | | | X | |
| E1 & E9 | X | | | | | | |
| E1 & E10 | | | | | | X | |
| E2 & E3 | | | | | | X | |
| E2 & E4 | | | X | | | | |
| E2 & E5 | | | | | | X | |
| E2 & E6 | | | | X | | | |
| E2 & E7 | | | | X | | X | |
| E2 & E8 | | X | | | | | |
| E2 & E9 | | X | | | | X | |
| E2 & E10 | | | | X | | | |
| E3 & E4 | | | X | | X | X | |
| E3 & E5 | | | | | X | | |
| E3 & E6 | | | | X | X | X | |
| E3 & E7 | | | | X | X | | |
| E3 & E8 | | X | | | | X | |
| E3 & E9 | | X | | | | | |
| E3 & E10 | | | | X | | X | |
| E4 & E5 | | | | | | X | |
| E4 & E6 | | | X | | | | |
| E4 & E7 | | | X | | | X | |
| E4 & E8 | | | | | | | X |
| E4 & E9 | | | | | | X | X |
| E4 & E10 | | | X | | | | X |
| E5 & E6 | | | | X | | X | |
| E5 & E7 | | | | X | | | |
| E5 & E8 | | | | | | X | X |
| E5 & E9 | | | | | | | X |
| E5 & E10 | | | | X | | X | X |
| E6 & E7 | | | | | | X | |
| E6 & E8 | | X | | | | | X |
| E6 & E9 | | X | | | | X | X |
| E6 & E10 | | | | | | | X |
| E7 & E8 | | X | | | | X | X |
| E7 & E9 | | X | | | | | X |
| E7 & E10 | | | | | | X | X |
| E8 & E9 | | | | | | X | |
| E8 & E10 | | X | | | | | |
| E9 & E10 | | X | | | | X | |

together the paired intermediate lines heading each such column will test for all the multiple error conditions. In particular, the column headed "L1/ & /XJ" shows that when any odd-numbered converter input signal is present at the same time that any even-numbered input signal is present i.e.(E1 & E2, E1 & E4, E1 & E6 ... E9 & E10), the two signals L1 and XJ are both produced. Hence, ANDing the L1 and XJ signals together develops the multiple error signal in response to one-half the possible multiple-error conditions.

As a further example, Table II indicates that the concident receipt by the converter 26 of error signals E1 and E3, or E1 and E5, or E1 and E7, or E1 and E9 is acertained by ANDing together the intermediate signals XA and XB.

The logic unit 32 shown in detail in FIG. 3 is constructed in accordance with Table II. This is seen by noting that each AND circuit 42 through 52 and 58 ANDs together one pair of the intermediate lines heading a column in Table II. The remaining components in the FIG. 3 circuit simply OR together the signals resulting from the seven AND operations; the particular circuit configuration shown reflects restrictions imposed by available hardware.

The desired intermediate signals and pairing as described above can, where desired, be determined with the aid of a computer; perhaps the obvious way being a trial-and-error approach to determine the smallest set of signals pairs. The smallest set is desired because it can be implemented with the least hardware. However, the intermediate signals listed hereinabove which the FIG. 2 converter develops, and their pairing by means of the FIG. 3 logic circuit in accordance with Table II were determined manually.

In summary, the foregoing invention provides a highly economical error indicating system that indicates individual error signals with a coded identification of the error source and, further, indicates a multiple-error condition in an unambiguous manner. By reason of the unambiguous indication of multiple-error conditions, all output indications other than the multiple error indication are known for certain to identify a single incoming error source.

This type of condition indication is of considerable value in the operation and servicing of electrical equipment, particularly of electronic digital processing equipment.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what I claim as new and secure by Letters Patent is the following.

1. An error detecting code conversion network for converting any single one of a plurality of electronic input signals indicative of a fault, the input signals numerically ordered according to radix (M), to deliver electronic signals coded according to a radix (N), where (M) and (N) are integers and (M) is larger than (N), and for converting any two or more of the plurality of electronic input signals indicative of two or more concurrent faults into a unique combination of signals indicative of multiple concurrent faults comprising:

a. a first digital logic means producing first electronic output signals coded according to the radix (N) in response to the electronic input signals numerically ordered according to the radix (M);

b. a second digital logic means coupled with said first logic section and producing second electronic output signals in response to any substantially coincident combination of two or more of certain electronic input signals;

storage means coupled to said second digital logic section for storing the second electronic output signals;

and translating means coupled to said storage means and to said first and second digital logic means, said translating means responsive to said first logic means for translating the first electronic output signals from said first digital logic means into human observable signals, said translating means also responsive to said second digital logic means for translating the second electronic signals into human observable signals.

2. An electrical code conversion network as recited in claim 1 wherein the second electronic output signal remains stored in said storage means until said storage means is manually reset.

3. An electrical code conversion network as recited in claim 1 including input means and output means coupled to said first digital logic means and wherein said input means inputs signals with a first number of digits and said output means outputs signals representing each of said first number of digits with a selected value other than zero.

4. An apparatus for producing a coded indication of which single incoming input line of a plurality of incoming input lines carries an error condition said apparatus also capable of responding to the receipt of concurrent plural error conditions for more than one of the incoming input lines and producing an unambiguous single or multiple error signal comprising:

a. a code converting network for converting input signals of a numerical code having a radix (M) to deliver signals of a numerical code having a radix (N);

b. a plurality of input lines coupled to said code converting network said input lines numerically ordered in accordance with a code having the radix (M), and a plurality of output lines coupled to said code converting network said output lines numerically ordered in accordance with a code having the radix (N);

c. first digital logic means coupled to said numerically ordered input lines for producing a first signal with a numerical code of radix (M) when an error condition occurs in any single input line, said first signal being converted to a signal with a numerical code of radix (N) by said code converting network;

d. second digital logic means coupled to said input and output lines for producing a second signal on said output lines when a multiple substantially concurrent error condition occurs in two or more of said input lines;
e. and translating means coupled to said output lines, said translating means responsive to said first digital logic means for translating the first converted signal with numerical code of radix (N) into human observable signals, said translating means also responsive to said second digital logic means for translating the second signal into human observable signals.

5. An apparatus as recited in claim 4 including error store means coupled to said input lines and to said first and second digital logic means for storing either of said first or second signals.

6. An apparatus as recited in claim 5 wherein said first or second signal remain stored in said error store means until said error store means is reset.

7. An apparatus for differentiating between a single error condition and a multiple error condition comprising:
a. a decimal-to-binary converter having;
1. a first plurality of decimally ordered input lines connected to said converter, and
2. a second plurality of binary-ordered input lines connected to said converter, with said second plurality being fewer in number than said first plurality of input lines;
b. a digital logic network means connected with said converter for providing a first type error signal upon sensing an input signal on a single one of said first plurality of input lines, and providing a second type error signal upon sensing the coincident receipt of input signals on at least two of said plurality of input lines; and
c. error store means for storing either of said first type or second type error signals.

8. An electrical encoding network comprising:
a. a decimal-to-binary converter having:
1. a first plurality of input lines receiving decimally encoded signals,
2. a plurality of output lines of number fewer than said first plurality of input lines transmitting respectively binary encoded signals in response to said decimally encoded signals,
3. a first level of logic gating means for receiving electrical signals on said plurality of input lines, and for partially converting said decimally encoded signals,
4. a second level of logic gating means for producing binary encoded electrical output signals on said plurality of output lines,
5. intermediate lines connecting said first level logic gating means to said second level logic gating means;
b. a sensing logic network having;
1. a second plurality of input lines,
2. a single output line,
3. logic gating means connected between said second plurality of input lines and said single output line and producing a further signal on said single output line only upon sensing the simultaneous receipt of input signals on at least two of said second plurality of input lines;
c. said second plurality of lines connecting said decimal to binary converter to said sensing logic network comprising;
1. third lines connecting between said first plurality of input lines and said sensing network logic gating means,
2. fourth lines connecting between said intermediate lines and said sensing network logic gating means, and
3. fifth lines connecting between said plurality of output lines to said sensing network logic gating means.

* * * * *